US009438902B2

(12) United States Patent
Guo et al.

(10) Patent No.: US 9,438,902 B2
(45) Date of Patent: Sep. 6, 2016

(54) METHOD, DEVICE AND TERMINAL FOR DECODING

(75) Inventors: Meng Guo, Beijing (CN); Libo Yang, Beijing (CN); Jian Zhang, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 497 days.

(21) Appl. No.: 13/997,838

(22) PCT Filed: Dec. 26, 2011

(86) PCT No.: PCT/CN2011/084631
§ 371 (c)(1),
(2), (4) Date: Jun. 25, 2013

(87) PCT Pub. No.: WO2012/089078
PCT Pub. Date: Jul. 5, 2012

(65) Prior Publication Data
US 2013/0287095 A1 Oct. 31, 2013

(30) Foreign Application Priority Data
Dec. 30, 2010 (CN) .......................... 2010 1 0623562

(51) Int. Cl.
H04N 7/12 (2006.01)
H04N 11/02 (2006.01)
(Continued)

(52) U.S. Cl.
CPC ...... *H04N 19/00206* (2013.01); *H04N 19/117* (2014.11); *H04N 19/132* (2014.11);
(Continued)

(58) Field of Classification Search
CPC ............. H04N 19/132; H04N 19/156; H04N 19/00206; H04N 19/172; H04N 19/117; H04N 19/86; H04N 19/44; H04N 19/82; H04N 19/523

USPC ..................................................... 375/240.02
See application file for complete search history.

(56) References Cited

U.S. PATENT DOCUMENTS 5,949,484 A    9/1999  Nakaya et al.
7,809,064 B2  10/2010  Chen et al.
(Continued)

FOREIGN PATENT DOCUMENTS

CN    1522074 A    8/2004
CN    1745587 A    3/2006
(Continued)

OTHER PUBLICATIONS

International Search Report (in Chinese with English translation) for PCT/CN2011/084631, mailed Apr. 5, 2012; ISA/CN.

*Primary Examiner* — Sath V Perungavoor
*Assistant Examiner* — Boubacar Abdou Tchoussou
(74) *Attorney, Agent, or Firm* — Harness, Dickey & Pierce, P.L.C.

(57) ABSTRACT

A method for decoding includes: determining an expected power according to the current remaining power and an expected decoding time length, determining a first average power according to the accumulated decoding time length and the accumulated power consumption of the decoder from the moment it starts to work until the current moment; determining a second average power according to the accumulated decoding time length and the accumulated power consumption in the process of decoding the latest preset number of image groups; when the absolute value of the difference between the expected power and the second average power exceeds a preset threshold and the expected power is not equal to the first average power, determining the operation mode of the decoder according to the size relationship between the expected power and the first average power and decoding a data frame according to the determined operation mode.

19 Claims, 4 Drawing Sheets

(51) Int. Cl.
*H04N 11/04* (2006.01)
*H04N 19/156* (2014.01)
*H04N 19/172* (2014.01)
*H04N 19/117* (2014.01)
*H04N 19/132* (2014.01)
*H04N 19/44* (2014.01)
*H04N 19/82* (2014.01)
*H04N 19/523* (2014.01)
*H04N 19/86* (2014.01)

(52) U.S. Cl.
CPC .......... *H04N19/156* (2014.11); *H04N 19/172* (2014.11); *H04N 19/44* (2014.11); *H04N 19/523* (2014.11); *H04N 19/82* (2014.11); *H04N 19/86* (2014.11)

(56) References Cited

U.S. PATENT DOCUMENTS

| | | | |
|---|---|---|---|
| 7,881,367 B2 | 2/2011 | Jung | |
| 7,953,283 B2 | 5/2011 | Inoue | |
| 8,442,111 B2* | 5/2013 | Garg | H04N 19/172 375/240 |
| 2004/0158878 A1 | 8/2004 | Ratnakar et al. | |
| 2005/0213665 A1* | 9/2005 | Kyusojin | H04N 19/63 375/240.25 |
| 2005/0213929 A1* | 9/2005 | Cheng | G06F 1/3203 386/277 |
| 2005/0268123 A1* | 12/2005 | Arakawa | G06F 1/3203 713/300 |
| 2006/0104348 A1 | 5/2006 | Chen et al. | |
| 2006/0171454 A1 | 8/2006 | Jung | |
| 2007/0274400 A1 | 11/2007 | Murai et al. | |
| 2008/0138046 A1* | 6/2008 | Nakazawa | H04N 19/29 386/263 |
| 2008/0144949 A1 | 6/2008 | Inoue | |
| 2009/0270138 A1 | 10/2009 | Raveendran | |
| 2010/0046627 A1* | 2/2010 | Xiao | H03M 7/425 375/240.23 |
| 2011/0268425 A1* | 11/2011 | Glen | H04N 5/63 386/272 |
| 2012/0014446 A1* | 1/2012 | Ma | H04N 19/61 375/240.13 |

FOREIGN PATENT DOCUMENTS

| | | |
|---|---|---|
| CN | 101047853 A | 10/2007 |
| CN | 101156449 A | 4/2008 |
| CN | 101287124 A | 10/2008 |
| CN | 101466039 A | 6/2009 |
| GB | 2 366 467 A | 3/2002 |
| TW | 200616452 A | 5/2006 |

* cited by examiner

METHOD, DEVICE AND TERMINAL FOR DECODING

CROSS-REFERENCE TO RELATED APPLICATIONS

The application is a 371 National Stage application of PCT international application PCT/CN2011/084631, filed on Dec. 26, 2011 which claims the priority of Chinese patent application No. 201010623562.3, titled "DECODING METHOD, DECODING DEVICE AND TERMINAL" and filed with the State Intellectual Property Office on Dec. 30, 2010, both of which are incorporated herein by reference in their entirety.

FIELD OF THE INVENTION

The present invention relates to the field of communications technology, and in particular to a decoding method, a decoding device and a terminal.

BACKGROUND OF THE INVENTION

With the development of communications technology and multimedia encoding/decoding technology, more and more portable terminal apparatus, such as mobile phone, netbook, electronic book and Personal Digital Assistant (PDA), are provided with media play functions.

In order to support media play function, a decoder is provided to portable terminal apparatus, which is used to decode a compressed bit stream into video frames. FIG. 1 is a structure schematic diagram of a decoder according to the prior art, which includes an entropy decoding module, a residual processing module, an intra-frame predicting module, an inter-frame predicting module and a deblocking filtering module. Specifically, the entropy decoding module performs entropy decoding on the compressed bit stream to obtain information such as a residual, a block type, a prediction mode, a motion vector and a reference frame number. The residual processing module performs an inverse scanning, an inverse quantization and an inverse transformation on the residual obtained by the entropy decoding. The intra-frame predicting module and the inter-frame predicting module extract corresponding reference image data from a reference frame to generate a predicting block, according to information such as the block type, the prediction mode, the motion vector and the reference frame number obtained by the entropy decoding. The predicting block is superposed with a residual block generated by the residual processing module, and then the deblocking filtering is performed by the deblocking filtering module, to obtain the output video frame.

The inventor of the present invention finds that there are at least the following problems in the prior art.

The decoder of the portable terminal apparatus is mainly powered by a battery, which limits the standby time and operation time of the decoder. Thus, the decoder can not support long-time multimedia play, and multimedia file will not be completely played due to low electrical quantity.

SUMMARY OF THE INVENTION

An object of the embodiments of the invention is to provide a decoding method, a decoding device and a terminal, thus controlling the operation time of a decoder. In view of this, the embodiments of the present invention include the following technical solutions.

A decoding method, includes:
determining an expected power and a current power of a decoder, and determining an operation mode of the decoder according to the expected power and the current power; and
decoding a data frame according to the determined operation mode.

A decoder, includes:
a power determining module configured to determine an expected power and a current power of the decoder;
a mode determining module configured to determine an operation mode of the decoder according to the expected power and the current power; and
an inter-frame predicting module, a deblocking filtering module and a residual processing module which are configured to decode a data frame according to the determined operation mode.

A terminal includes the decoder.

The embodiments of the present invention have the following advantages: the operation mode of the decoder is determined according to an expected power and a current power of the decoder, so as to adjust the power of the decoder dynamically and control the decoding time of the decoder. As matter of course, any product for implementing the embodiment of the present invention does not necessarily achieve all of the advantages described above.

DETAILED DESCRIPTION OF THE INVENTION

Technical solutions of the present invention will be described clearly and completely in conjunction with the accompanying drawings of the present invention hereinafter. Obviously, the described embodiments are some embodiments of the present invention, rather than all of the embodiments. Other embodiments which are obtained by those skilled in the art without any creative work based on the embodiments of the present invention, fall within the scope of protection of the present invention.

Figure 1:
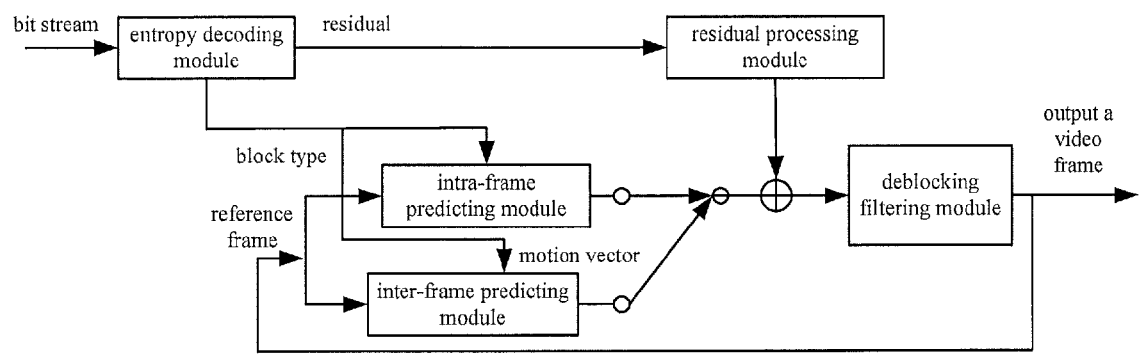
FIG. 1 is a structure schematic diagram of a decoder according to the prior art.
Figure 2:
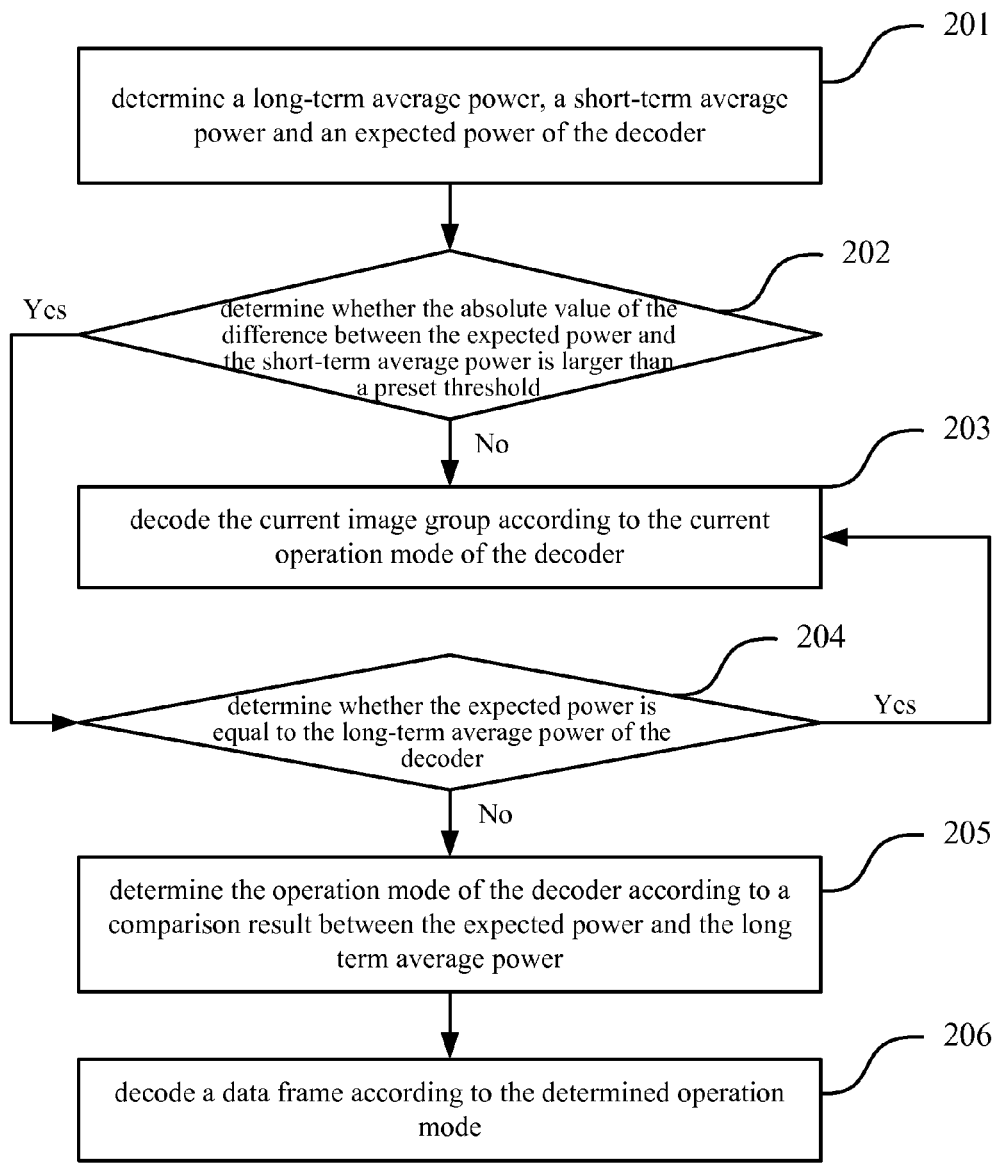
FIG. 2 is a flowchart of a decoding method according to an embodiment of the present invention.

FIG. 2 is a flowchart of a decoding method according to an embodiment of the present invention. The decoding method includes the following steps.

Step 201, determining a long-term average power, a short-term average power and an expected power of a decoder.

In the present embodiment, an expected power and a current power of the decoder can be determined, and an operation mode of the decoder is determined according to the expected power and the current power. A data frame is decoded according to the determined operation mode. The current power includes the long-term average power and the short-term average power. Therefore, the long-term average power, the short-term average power and the expected power of the decoder can be determined in step 201.

Specifically, the long-term average power of the decoder is an average power of the decoder from the beginning of the work to the current moment, which can be calculated from the cumulative decoding time and a cumulative electrical quantity consumption of the decoder from the beginning of the work to the current moment, shown as the following formula:

$$P_a = \frac{B_a}{T_c} = \frac{B_z - B_c}{T_c} \quad [1]$$

where $P_a$ is a long-term average power of the decoder, $B_a$ is the cumulative electrical quantity consumption of the decoder from the beginning of the work to the current moment, $B_z$ is the remaining electrical quantity of a terminal with the decoder at the moment that the decoder starts to work, $B_c$ is the currently remaining electrical quantity of the terminal with the decoder, $T_c$ is the cumulative decoding time of the decoder from the beginning of the work to the current moment.

The short-term average power of the decoder is an average power in the process of decoding a latest preset number of image groups by the decoder, which can be calculated from the cumulative decoding time length and the cumulative electrical quantity consumption in the process of decoding the latest N image groups by the decoder, where N is a natural number greater than 1, and generally is between 5 and 10.

In order to facilitate the calculation of the short-term average power of the decoder, the remaining electrical quantity $B_k$ and the cumulative decoding time $T_k$ of a terminal with the decoder can be recorded in a short-term list, at the moment that the decoder starts to decode the latest N image groups, where k is greater than 0 and less than or equal to N.

For example, in the case that N is equal to 9, the short-term list is shown as table 1.

TABLE 1

| short-term list | | | | | | | | | |
|---|---|---|---|---|---|---|---|---|---|
| | sequence number k of the image group | | | | | | | | |
| | 1 | 2 | 3 | 4 | 5 | 6 | 7 | 8 | 9 |
| remaining electrical quantity $B_k$ (C) | 6 | 7 | 9 | 12 | 13 | 17 | 19 | 21 | 25 |
| cumulative decoding time length $T_k$ (min) | 22 | 20 | 21 | 18 | 16 | 13 | 11 | 10 | 8 |

The short-term list can be updated when a new image group is decoded during the operation of the decoder. The $B_N$ and $T_N$ is removed from the list, and $B_{k+1}=B_k$, $T_{k+1}=T_k$, where k is from 1 to N−1, and the currently remaining electrical quantity and the current cumulative decoding time of the terminal with the decoder are respectively assigned to $B_1$ and $T_1$. For example, if the currently remaining electrical quantity and the current cumulative decoding time length of the terminal with the decoder are respectively 5 C and 23 min when a new image group starts to be decoded, the updated short-term list is shown as table 2.

TABLE 2

| updated short-term list | | | | | | | | | |
|---|---|---|---|---|---|---|---|---|---|
| | sequence number k of the image group | | | | | | | | |
| | 1 | 2 | 3 | 4 | 5 | 6 | 7 | 8 | 9 |
| remaining power $B_k$ (C) | 5 | 6 | 7 | 9 | 12 | 13 | 17 | 19 | 21 |
| cumulative decoding time length $T_k$ (min) | 23 | 22 | 20 | 21 | 18 | 16 | 13 | 11 | 10 |

The short-term average power of the decoder can be calculated by the following formula.

$$P_b = \frac{B_b}{T_b} = \frac{B_N - B_c}{T_c - T_N} \quad [2]$$

where $P_b$ is the short-term average power of the decoder, $B_b$ is the cumulative electrical quantity consumption in the process of decoding the latest N image groups by the decoder, $T_b$ is the cumulative decoding time in the process of decoding the latest N image groups by the decoder, $B_N$ is the remaining electrical quantity of a terminal with the decoder at the moment that the decoder starts to decode the latest N image groups, $B_c$ is the current remaining electrical quantity of the terminal with the decoder, $T_c$ is the cumulative decoding time of the decoder from the beginning of the work until the current moment, $T_N$ is the cumulative decoding time length at the moment that the decoder starts to decode the latest N image groups.

In various embodiments of the present invention, the long-term average power can also be referred to a first average power, the short-term average power can also be referred to a second average power, and the illustration will not be repeated hereinafter.

The expected power of the decoder is a power of the decoder under the conditions that the decoder meets the expected operation time, which can be calculated from the currently remaining electrical quantity and the expected decoding time length of the terminal with the decoder, shown as the following formula:

$$P_c = \frac{B_c}{T_u} \quad [3]$$

where $P_c$ is the expected power of the decoder, $B_c$ is the currently remaining electrical quantity of the terminal with the decoder, $T_u$ is the expected decoding time which can be determined according to a length of a multimedia program or can be set by a user.

Step 202, determining whether the absolute value of the difference between the expected power and the short-term average power of the decoder is larger than a preset threshold; if the absolute value is larger than the preset threshold, going to step 204; otherwise, going to step 203.

Specifically, the absolute value of the difference between the expected power and the short-term average power being larger than the preset threshold described above may specifically be that the absolute value of the difference between the expected power and the short-term average power is greater than a preset multiple of the short-term average power, shown as the following formula:

$$|P_b - P_c| > f \times P_b \quad [4]$$

where $P_b$ is the short-term average power of the decoder, $P_c$ is the expected power of the decoder, f is a coefficient for determining the similarity degree between $P_b$ and $P_c$, which may be 0.1.

It should be noted that the absolute value of the difference between the expected power and the short-term average power being larger than the preset threshold described above also may specifically be that the absolute value of the difference between the expected power and the short-term average power is greater than a preset value, or the absolute value of the difference between the expected power and the short-term average power is greater than a preset multiple of the expected power.

Step 203, decoding the current image group according to the current operation mode of the decoder.

Specifically, the decoder may be operated in four operation modes, shown as table 3.

TABLE 3 operation mode of the decoder

| operation mode | sequence number of the mode Ms | illustration |
| --- | --- | --- |
| mode 0 | 0 | normal decoding mode |
| mode 1 | 1 | simplified residual mode |
| mode 2 | 2 | simplified residual calculation and simplified half-pixel calculation |
| mode 3 | 3 | simplified residual calculation, simplified half-pixel calculation and simplified deblocking filtering |

Specifically, mode 0 corresponds to a normal decoding mode, i.e., a conventional operation mode of the decoder, in which none of the residual calculation, the half-pixel calculation and the deblocking filtering is simplified.

The residual calculation is simplified by the decoder in mode 1 on the basis of the normal decoding mode. That is to say, in the case that the number of nonzero elements in a macro block is less than T, inverse scanning, inverse quantization and inverse transformation on the macro block are omitted and the macro block is set to 0. T can be set to a natural number greater than 0 according to specific applications.

Figure 3:
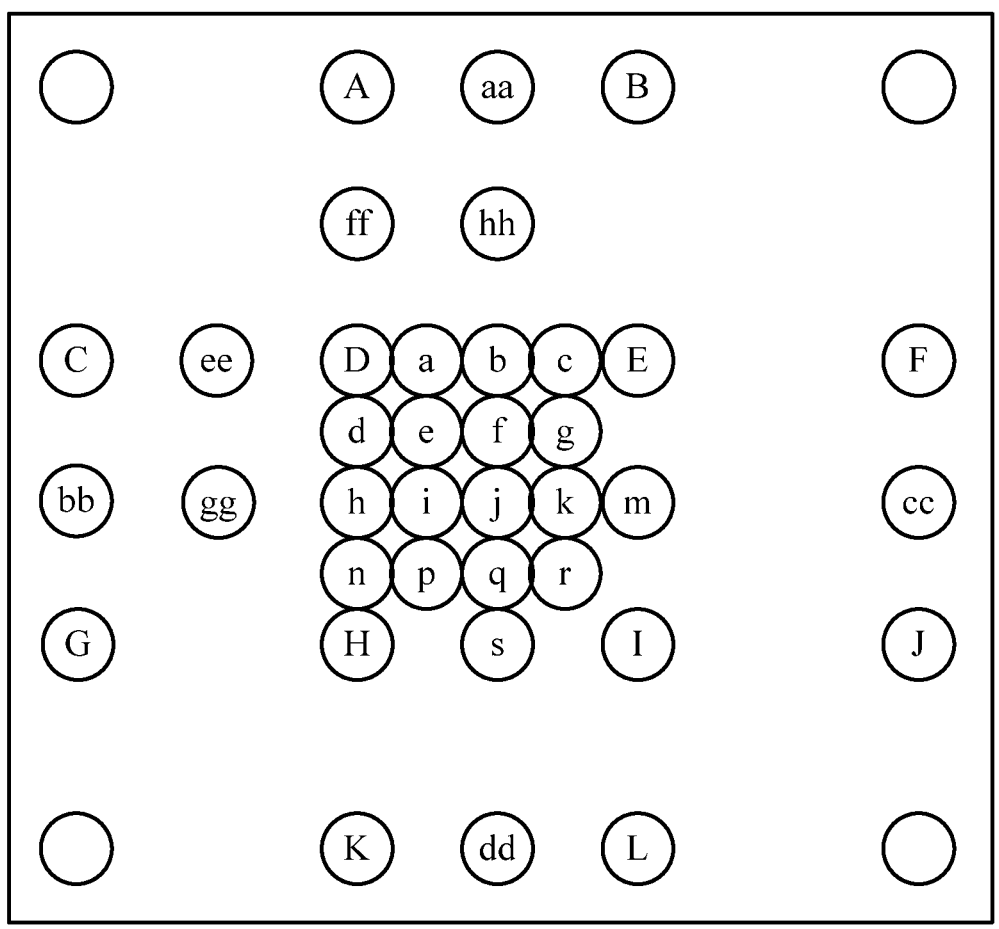
FIG. 3 is a schematic diagram of integer-pixels and half-pixels according to an embodiment of the present invention.

The half-pixel calculation is simplified by the decoder in mode 2 on the basis of the mode 1. As shown in FIG. 3, b, h, j, m, s are half-pixels within integer-pixels, and A, B, C, D, E, F, G, H, I, J, K and L are the integer-pixels. The half-pixel can be calculated according to six adjacent integer-pixels thereof in a video coding standard. In order to reduce power consumption, a half-pixel interpolation calculation can be simplified by the decoder mode in mode 2 as follows: determining the half-pixel according to four adjacent integer-pixels thereof. For example:

$b = \text{CLIP}((C+3 \times D+3 \times E+F+4)>>3,0,255);$ $h = \text{CLIP}((A+3 \times D+3 \times H+K+4)>>3,0,255);$ $s = \text{CLIP}((G+3 \times H+3 \times I+J+4)>>3,0,255);$ $m = \text{CLIP}((B+3 \times E+3 \times I+L+4)>>3,0,255);$ $j = \text{CLIP}((D+E+H+I+2)>>2,0,255).$ [5]

The deblocking filtering is simplified by the decoder in mode 3 on the basis of the mode 2. It is determined whether an encoding block is filtered according to a type and a motion vector thereof. Specifically, the type of the encoding block is determined during the deblocking filtering. A conventional deblocking filtering is performed for an intra-frame encoding block. For an inter-frame encoding block, it is determined the relationship among motion vectors of the inter-frame encoding block, an adjacent encoding block on the upside and an adjacent encoding block immediately on the left. If symbols of motion vectors of the inter-frame encoding block and the adjacent encoding blocks on the upside in the horizontal direction are same, the deblocking filtering is performed on the inter-frame encoding block in the horizontal direction; otherwise, the deblocking filtering is omitted for the inter-frame encoding block in the horizontal direction. If symbols of motion vectors of the inter-frame encoding block and the adjacent encoding block on the left in the vertical direction are same, the deblocking filtering is performed on the inter-frame encoding block in the vertical direction; otherwise, the deblocking filtering is omitted for the inter-frame encoding block in the vertical direction.

It should be noted that the operation modes of the decoder according to the embodiments of the present invention are not limited to the four operation modes cited in table 3, and can also include other types of operation modes, for example, an operation mode of simplified half-pixel calculation and simplified deblocking filtering, and an operation mode of simplified residual calculation and simplified deblocking filtering.

Step 204, determining whether the expected power is equal to the long-term average power of the decoder; If no, going to step 205; otherwise, going to step 203.

Step 205, determining the operation mode of the decoder according to a comparison result between the expected power and the long term average power.

Specifically, if the expected power is smaller than the long-term average power, and not all of the residual calculation, the half-pixel calculation and the deblocking filtering are simplified in the current operation mode of the decoder, one or more of the residual calculation, the half-pixel calculation and the deblocking filtering can be simplified on the basis of the current operation mode of the decoder. The simplified operation mode can refer to the description for the operation mode of the decoder in step 204. If the expected power is smaller than the long-term average power, and all of the residual calculation, the half-pixel calculation and the deblocking filtering are simplified in the current operation mode of the decoder, the current operation mode of the decoder may not be adjusted.

If the expected power is greater than the long-term average power, and the current operation mode of the decoder is the simplified decoding mode, one or more of the simplified residual calculation, the simplified half-pixel calculation and the simplified deblocking filtering can be restored on the basis of the current operation mode of the decoder. If the expected power is greater than the long-term average power, and the current operation mode of the decoder is not the simplified decoding mode, the current operation mode of the decoder may not be adjusted.

The simplified decoding mode includes one or more of the following processes: the simplified residual calculation, the simplified half-pixel calculation and the simplified deblocking filtering. The operation mode of restoring the simplified residual calculation includes: performing inverse scanning, inverse quantization and inverse transformation on the macro block. The operation mode of restoring the simplified half-pixel calculation includes: determining a half-pixel according to six adjacent integer pixels thereof; the operation mode of restoring the simplified deblocking filtering includes: performing a conventional deblocking filtering on all encoding blocks, i.e. performing the deblocking filtering in both the horizontal direction and the vertical direction.

Furthermore, different operation modes of the decoder can have different sequence numbers Ms of the mode. The sequence number of operation mode of the decoder can be increased in accordance with the descending order of complexity of the decoding process. Therefore, the operation mode can be determined by changing the sequence number of operation mode. When the expected power Pc is smaller than the long-term average power Pa, if Pc>K1*Pa and the sequence number of the current operation mode of the decoder≤2, 1 is added to the sequence number of the current operation mode of the decoder, i.e. Ms=Ms+1; if K1*Pa≥Pc>K2*Pa and the mode number of the current operation mode of the decoder≤1, 2 is added to the sequence number of the current operation mode of the decoder, i.e. Ms=Ms+2; if Pc≤K2*Pa and the sequence number of the current operation mode of the decoder≤0, 3 is added to the sequence number of the current operation mode of the decoder, i.e. Ms=Ms+3, where 1>K1>K2>0, optionally K1 can be equal to 0.76 and K2 can be equal to 0.62.

When Pc is greater than Pa, if Pc<K3*Pa and the sequence number of the current operation mode of the decoder≥1, 1 is subtracted from the sequence number of the current operation mode of the decoder, i.e. Ms=Ms−1; if K3*Pa≤Pc<K4*Pa and the sequence number of the current operation mode of the decoder≥2, 2 is subtracted from the sequence number of the current operation mode of the decoder, i.e. Ms=Ms−2; If Pc≥K4*Pa and the sequence number of the current operation mode of the decoder≥3, 3 is subtracted from the mode number of the current operation mode of the decoder, i.e. Ms=Ms−3. where 1<K3<K4, optionally K3 can be equal to 1.24 and K4 can be equal to 1.38.

During the process of adjusting the sequence number Ms of the operation mode of the decoder, Ms can be limited as the following: Ms=CLIP (Ms, 0, 3), i.e. Ms is an integer which is not less than 0 and not greater than 3.

It should be noted that the sequence number of operation mode of the decoder can also be decreased in accordance with the descending order of complexity of the decoding process in other embodiments of the present invention. Accordingly, the way of changing the sequence number of operation mode is opposite to the way described above, the object of determining the operation mode of the decoder can also be achieved.

Step 206, decoding a data frame according to the determined operation mode.

The data frame includes a reference frame and a non-reference frame. If the determined operation mode is not the simplified decoding mode, the reference frame and the non-reference frame are decoded according to the determined decoding mode. If the determined operation mode is the simplified decoding mode, in order to avoid the transmission of the errors introduced by the simplified decoding processing, the non-reference frame can be decoded according to the simplified decoding mode i.e. only the simplified decoding processing relate to the operation modes 1, 2, 3 is performed to the non-reference frame. The non-simplified decoding mode is performed to the reference frame, i.e. the reference frame is decoded by the conventional decoding mode.

The embodiments of the present invention have the following advantages. The operation mode of the decoder is determined by comparing the expected power of the decoder with the short-term average power and the long-term average power thereof to simplify or to restore the decoding processing, so as to adjust the power of the decoder dynamically and implement the control of the multimedia play time. As a matter of course, a product for implementing one of the embodiments of the present invention does not necessarily achieve all of the advantages described above.

According to the decoding method provided by the embodiments described above, an embodiment of the present invention also provides a device on which the decoding method described above is applied.

Figure 4:
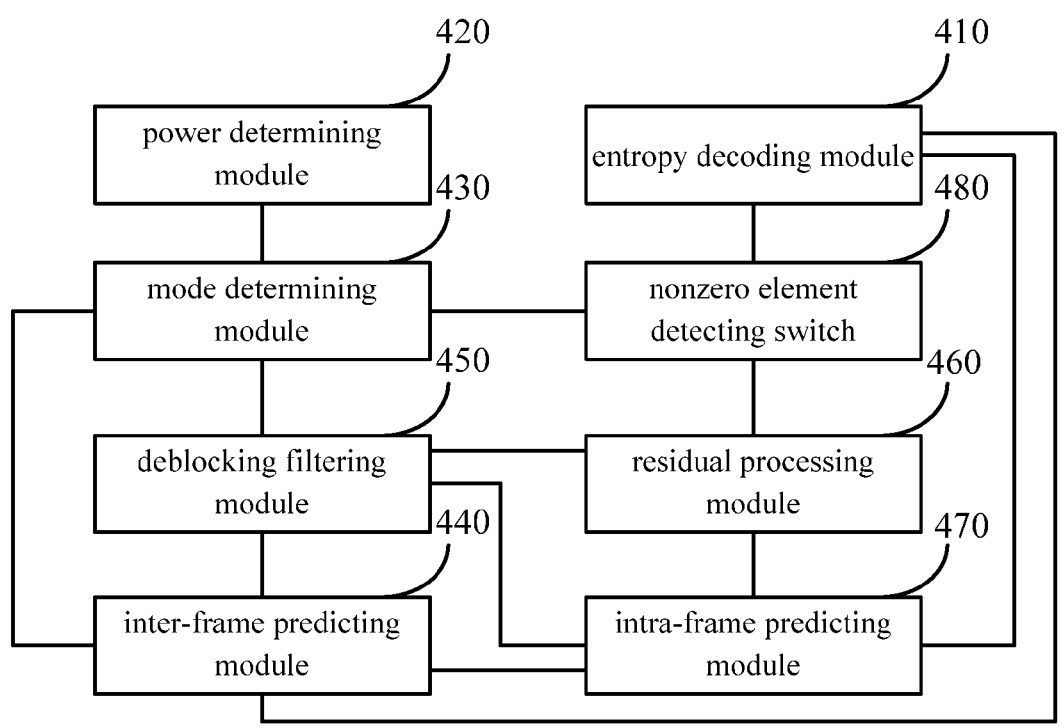
FIG. 4 is a structure schematic diagram of a decoder according to an embodiment of the present invention.

FIG. 4 is a structure schematic diagram of a decoder according to an embodiment of the present invention. The decoder includes the following modules.

An entropy decoding module 410 is configured to perform an entropy decoding on a compressed bit stream to obtain information such as a residual, a block type, a prediction mode, a motion vector and a reference frame number.

A power determining module 420 is configured to determine an expected power of the decoder according to a currently remaining electrical quantity and an expected decoding time of the terminal with the decoder, to determine a long-term average power of the decoder according to a cumulative decoding time and a cumulative electrical quantity consumption of the decoder from the beginning of the work to the current moment, and to determine a short-term average power of the decoder according to the cumulative decoding time and the cumulative electrical quantity consumption in the process of decoding a latest preset number of image groups by the decoder.

Specifically, the long-term average power is an average power of the decoder from the beginning of the work to the current moment, and the short-term average power is an average power in the process of decoding the latest preset number of image groups by the decoder.

A mode determining module 430 is configured to determine an operation mode of the decoder according to a comparison result between the expected power and the long-term average power when the absolute value of the difference between the expected power and the short-term average power is larger than a preset threshold and the expected power is not equal to the long-term average power.

The preset threshold can be any one of a preset value, a preset multiple of the expected power and a preset multiple of the short-term average power. Accordingly, the absolute value of the difference between the expected power and the short-term average power being larger than a preset threshold may specifically include: the absolute value of the difference between the expected power and the short-term average power is greater than the preset multiple of the short-term average power; the absolute value of the difference between the expected power and the short-term average power is greater than the preset value; or the absolute value of the difference between the expected power and the short-term average power is greater than the preset multiple of the expected power.

The mode determining module 430 is specifically configured to simplify one or more of residual calculation, half-pixel calculation and deblocking filtering on the basis of the current operation mode of the decoder in the case that the expected power is smaller than the long-term average power, and not all of the residual calculation, the half-pixel calculation and the deblocking filtering are simplified in the current operation mode of the decoder; and not to adjust the current operation mode of the decoder in the case that the expected power is smaller than the long-term average power, and all of the residual calculation, the half-pixel calculation and the deblocking filtering are simplified in the current operation mode of the decoder.

If the expected power is greater than the long-term average power and the current operation mode of the decoder is the simplified decoding mode, the mode determining module 430 may restore one or more of the simplified residual calculation, the simplified half-pixel calculation and the simplified deblocking filtering on the basis of the current operation mode of the decoder. If the expected power is greater than the long-term average power and the current operation mode of the decoder is not the simplified decoding mode, the mode determining module 430 may not adjust the current operation mode of the decoder.

The simplified decoding mode is one or more of the simplified residual calculation, the simplified half-pixel calculation and the simplified deblocking filtering. The operation mode of restoring the simplified residual calculation includes: performing inverse scanning, inverse quantization and inverse transformation on a macro block. The operation mode of restoring the simplified half-pixel calculation includes: determining a half-pixel according to the six adjacent integer pixels thereof. The operation mode of restoring the simplified deblocking filtering includes: performing a conventional deblocking filtering on all the encoding blocks, i.e. performing the deblocking filtering in both the horizontal direction and in the vertical direction.

Furthermore, different operation modes of the decoder can have different sequence numbers, and the sequence number of operation mode of the decoder can be increased in accordance with the descending order of complexity of the decoding process. Therefore, the mode determining module 430 can achieve the object of adjusting the operation mode by changing the sequence number of operation mode.

Specifically, the mode determining module 430 is specifically configured to, when the expected power is smaller than the long-term average power, if the expected power>a product of the long-term average power and a first preset value, and the sequence number of the current operation mode of the decoder≤2, add 1 to the sequence number of the current operation mode of the decoder;

if a product of the long-term average power and a second preset value<the expected power≤the product of the long-term average power and the first preset value, and the sequence number of the current operation mode of the decoder≤1, add 2 to the sequence number of the current operation mode of the decoder; and if the expected power≤the product of the long-term average power and the second preset value, and the sequence number of the current operation mode of the decoder≤0, add 3 to the sequence number of the current operation mode of the decoder; and when the expected power is greater than the long-term average power, if the expected power<a product of the long-term average power and a third preset value, and the sequence number of the current operation mode of the decoder≥1, subtract 1 from the sequence number of the current operation mode of the decoder;

if a product of the long-term average power and a fourth preset value>the expected power≥the product of the long-term average power and the third preset value, and the sequence number of the current operation mode of the decoder≥2, subtract 2 from the sequence number of the current operation mode of the decoder; and if the expected power≥the product of the long-term average power and the fourth preset value, and the sequence number of the current operation mode of the decoder≥3, subtract 3 from the sequence number of the current operation mode of the decoder.

where the fourth preset value>the third preset value>1>the first preset value>the second preset value>0, the sequence number of the operation mode of the decoder is an integer which is not less than 0 and not greater than 3.

An inter-frame predicting module 440, a deblocking filtering module 450, a residual processing module 460 are configured to decode a data frame according to the determined operation mode.

Specifically, the data frame includes a reference frame and a non-reference frame. The inter-frame predicting module 440, the deblocking filtering module 450, and the residual processing module 460 are specifically configured to decode the non-reference frame according to a simplified decoding mode if the determined operation mode is the simplified decoding mode, and to decode the reference frame and the non-reference frame according to the determined decoding mode if the determined operation mode is not the simplified decoding mode. The simplified decoding mode is one or more of a simplified residual calculation, a simplified half-pixel calculation and a simplified deblocking filtering.

Specifically, in the case that the half-pixel calculation is simplified in the operation mode of the decoder, the inter-frame predicting module 440 is specifically configured to determine a half-pixel according to four adjacent integer pixels thereof.

In the case that the deblocking filtering is simplified in the operation mode of the decoder, the deblocking filtering module 450 is specifically configured to determine the type of the encoding block during the deblocking filtering; to perform a conventional deblocking filtering for the intra-frame encoding block; determine the relationship among motion vectors of the inter-frame encoding block, an adjacent encoding block on the upside and an adjacent encoding block on the left in the case of the inter-frame encoding block. If symbols of motion vectors of the inter-frame encoding block and the adjacent encoding block on the upside are opposite in the horizontal direction, the deblocking filtering module 450 omits the deblocking filtering for the inter-frame encoding block in the horizontal direction; otherwise, the deblocking filtering is performed on the inter-frame encoding block in the horizontal direction. If symbols of motion vectors of the inter-frame encoding block and the adjacent encoding block on the left are opposite in the vertical direction, the deblocking filtering module 450 omits the deblocking filtering for the inter-frame encoding block in the vertical direction; otherwise, the deblocking filtering process is performed on the inter-frame encoding block in the vertical direction.

An intra-frame predicting module 470 is configured to cooperate with the inter-frame predicting module 440, to extract reference image data from the reference frame and generate a predicting block according to information such as the block type, the prediction mode, the motion vector and the reference frame number obtained from entropy decoding. The predicting block is superposed with a residual block produced by the residual processing module 460, and then the deblocking filtering module 450 performs the deblocking filtering, so as to obtain the output video frame.

Preferably, the decoder may further includes:

a nonzero element detecting switch 480 configured to detect the number of nonzero elements in a macro block.

Accordingly, in the case that the residual calculation is simplified in the operation mode of the decoder, the residual processing module 460 is specifically configured to omit inverse scanning, inverse quantization and inverse transformation on the macro block and to set the macro block to 0 if the number of nonzero elements in the macro block is less than a preset threshold.

Embodiments of the present invention further provide a terminal, which includes the decoder described above.

Embodiments of the present invention include the following advantages: the operation mode of the decoder is determined by comparing the expected power of the decoder with the short-term average power and the long-term average power thereof to simplify or restore the decoding process, so as to adjust the power of the decoder dynamically and implement the control of the multimedia play time. As a matter of course, a product implementing one of the embodiments of the present invention does not necessarily achieve all of the advantages described above.

Those skilled in the art can understand that modules in the device according to the embodiment can be distributed in the device according to the embodiment according to the description of the embodiment, and can also be located in one or more devices different from the present embodiment by corresponding change. The modules of the embodiment described above can be combined into one module, and can also be further split into multiple submodules.

Through the above description of the embodiments, those skilled in the art can clearly know that the present invention can be implemented by means of software combined with a necessary universal hardware platform, and of course also can be implemented by hardware, but the former is a better embodiment in numerous cases. Based on such understanding, the essential part or the part contributing to the prior art of the technical solution of the present invention can be embodied in the form of a software product, the computer software product is stored in a storage medium and includes several instructions which enable a terminal apparatus (which may be a mobile phone, a personal computer, a server, or a network apparatus, etc.) to perform the method described according to the embodiments of the present invention.

The above described are only preferred embodiments of the present invention. It should be noted that some improvement and modification can be made without deviating from the principles of the present invention for those skilled in the art, and such improvement and modification should be regarded as falling within the scope of protection of the present invention.

The invention claimed is:

1. A decoding method for regulating a power of a decoder, comprising: determining, by a processor, an expected power of the decoder;
   determining, by the processor, a first average power of the decoder according to a cumulative decoding time and a cumulative electrical quantity consumption of the decoder from a moment when the decoder starts working to a current moment; and
   determining, by the processor, a second average power of the decoder, according to a cumulative decoding time and a cumulative electrical quantity consumption in the process of decoding a latest preset number of image groups by the decoder;
   determining, by the processor, an operation mode of the decoder according to a comparison result between the expected power and the first average power, in the case that the absolute value of the difference between the expected power and the second average power exceeds a preset threshold and the expected power is not equal to the first average power, wherein different modes of the decoder corresponds to different powers of the decoder; and
   decoding, by the processor, a data frame according to the determined operation mode,
   wherein the determining the operation mode of the decoder according to the comparison result between the expected power and the first average power comprises:
   if the expected power is smaller than the first average power and the current operation mode of the decoder is not a simplified decoding mode, configuring the decoder to operate in a first decoding mode, and
   if the expected power is greater than the first average power and the current operation mode of the decoder is the simplified decoding mode, configuring the decoder to operate in a second decoding mode.

2. The method according to claim 1, wherein
   the determining the expected power of the decoder, comprises:
   determining the expected power of the decoder according to a currently remaining electrical quantity and an expected decoding time; and
   the preset threshold is any one of a preset value, a preset multiple of the expected power, and a preset multiple of the second average power.

3. The method according to claim 2, wherein the decoding a data frame according to the determined operation mode comprises:
   decoding a non-reference frame according to the simplified decoding mode if the determined operation mode is the simplified decoding mode, wherein the simplified decoding mode is one or more of a simplified residual calculation, a simplified half-pixel calculation and a simplified deblocking filtering; and
   decoding a reference frame and a non-reference frame according to the determined decoding mode, if the determined operation mode is not the simplified decoding mode.

4. The method according to claim 1, wherein the first decoding mode comprises one or more of a simplified residual calculation, a simplified half-pixel calculation and a simplified deblocking filtering, and
   the second decoding mode comprises one or more of a residual calculation, a half-pixel calculation and a deblocking filtering.

5. The method according to claim 4, wherein the operation mode of the decoder, according to a descending order of complexity of the decoding process, comprises:
   a first operation mode, in which none of the residual calculation, the half-pixel calculation and the deblocking filtering is simplified;
   a second operation mode comprising any one of the simplified residual calculation, the simplified half-pixel calculation, and the simplified deblocking filtering;
   a third operation mode comprising any two of the simplified residual calculation, the simplified half-pixel calculation and the simplified deblocking filtering; and
   a fourth operation mode comprising the simplified residual calculation, the simplified half-pixel calculation and the simplified deblocking filtering.

6. The method according to claim 5, wherein the simplifying one or more of the residual calculation, the half-pixel calculation and the deblocking filtering on the basis of the current operation mode of the decoder, if the expected power is smaller than the first average power and not all of the residual calculation, the half-pixel calculation and the deblocking filtering are simplified in the current operation mode of the decoder, comprises:

when the expected power is smaller than the first average power, if the expected power is greater than a product of the first average power and a first preset value, and the current operation mode of the decoder is the first operation mode, the second operation mode or the third operation mode, adjusting the current operation mode of the decoder into an operation mode which is one level lower than the current operation mode in terms of complexity of the decoding process;

if the expected power is greater than a product of the first average power and a second preset value, and less than or equal to the product of the first average power and the first preset value, and the current operation mode of the decoder is the first operation mode or the second operation mode, adjusting the current operation mode of the decoder into an operation mode which is two levels lower than the current operation mode in terms of complexity of the decoding process;

if the expected power is less than or equal to the product of the first average power and the second preset value, and the current operation mode of the decoder is the first operation mode, adjusting the current operation mode of the decoder into an operation mode which is three levels lower than the current operation mode in terms of complexity of the decoding process;

where both the first preset value and the second preset value range from 0 to 1, and the first preset value is greater than the second preset value.

7. The method according to claim 5, wherein the restoring one or more of the simplified residual calculation, the simplified half-pixel calculation and the simplified deblocking filtering on the basis of the current operation mode of the decoder, if the expected power is greater than the first average power, and the current operation mode of the decoder is the simplified decoding mode, comprises: when the expected power is greater than the first average power, if the expected power is less than a product of the first average power and a third preset value, and the current operation mode of the decoder is the second operation mode, the third operation mode or the fourth operation mode, adjusting the current operation mode of the decoder into an operation mode which is one level higher than the current operation mode in terms of complexity of the decoding process;

if the expected power is less than a product of the first average power and a fourth preset value, and greater than or equal to the product of the first average power and the third preset value, and the current operation mode of the decoder is the third operation mode or the fourth operation mode, adjusting the current operation mode of the decoder into an operation mode which is two levels higher than the current operation mode in terms of complexity of the decoding process;

if the expected power is greater than or equal to the product of the first average power and the fourth preset value, and the current operation mode of the decoder is the fourth operation mode, adjusting the current operation mode of the decoder into an operation mode which is three levels higher than the current operation mode in terms of complexity of the decoding process;

where the third preset value is less than the fourth preset value and greater than 1.

8. The method according to claim 5, wherein the simplified residual calculation comprises:

omitting inverse scanning, inverse quantization and inverse transformation of a macro block and setting the macro block to 0, in the case that the number of nonzero elements in the macro block is less than a preset threshold.

9. The method according to claim 5, wherein the simplified deblocking filtering comprises:

omitting a deblocking filtering on an inter-frame encoding block in a horizontal direction, in the case that motion vectors of the inter-frame encoding block and an adjacent encoding block on the upside are opposite in the horizontal direction;

omitting the deblocking filtering on the inter-frame encoding block in the vertical direction, in the case that motion vectors of an inter-frame encoding block and an adjacent encoding block on the left are opposite in the vertical direction.

10. The method according to claim 5, wherein the simplified half-pixel calculation comprises:

determining a half-pixel according to four integer-pixels adjacent to the half-pixel.

11. A decoder for regulating a power, comprising a processor for executing program codes stored in a memory, to implement:

a power determining module configured to determine an expected power; and to determine a first average power of the decoder according to a cumulative decoding time and the cumulative electrical quantity consumption of the decoder from a moment when the decoder starts working to a current moment, and to determine a second average power of the decoder according to a cumulative decoding time length and a cumulative electrical quantity consumption in the process of decoding a latest preset number of image groups decoded by the decoder;

a mode determining module configured to determine an operation mode of the decoder according to a comparison result between the expected power and the first average power, in the case that the absolute value of the difference between the expected power and the second average power exceeds a preset threshold and the expected power is not equal to the first average power, wherein different modes of the decoder corresponds to different powers of the decoder; and an inter-frame predicting module, a deblocking filtering module and a residual processing module which are configured to decode a data frame according to the determined operation mode, wherein if the expected power is smaller than the first average power and the current operation mode of the decoder is not a simplified decoding mode, the mode determining module configures the decoder to operate in a first decoding mode, and if the expected power is greater than the first average power and the current operation mode of the decoder is the simplified decoding mode, the mode determining module configures the decoder to operate in a second decoding mode.

12. The decoder according to claim 11, wherein the power determining module is further configured to determine the expected power of the decoder according to a currently remaining electrical quantity and an expected decoding time.

13. The decoder according to claim 12, wherein the preset threshold is any one of: a preset value, a preset multiple of the expected power and a preset multiple of the second average power.

14. The decoder according to claim 12, wherein
the inter-frame predicting module, the deblocking filtering module and the residual processing module are further configured to:
decode a non-reference frame according to the simplified decoding mode in the case that the determined operation mode is a simplified decoding mode, wherein the simplified decoding mode is one or more of a simplified residual calculation, a simplified half-pixel calculation and a simplified deblocking filtering; and
decode a reference frame and a non-reference frame according to the determined decoding mode in the case that the determined operation mode is not the simplified decoding mode.

15. The decoder according to claim 11, wherein the first decoding mode comprises one or more of a simplified residual calculation, a simplified half-pixel calculation and a simplified deblocking filtering, and
the second decoding mode comprises one or more of a residual calculation, a half-pixel calculation and a deblocking filtering.

16. The decoder according to claim 15, wherein the operation mode of the decoder, according to a descending order of complexity of the decoding process, comprises:
a first operation mode, in which none of the residual calculation, the half-pixel calculation and the deblocking filtering is simplified;
a second operation mode comprising any one of the simplified residual calculation, the simplified half-pixel calculation, and the simplified deblocking filtering;
a third operation mode comprising any two of the simplified residual calculation, the simplified half-pixel calculation and the simplified deblocking filtering; and
a fourth operation mode comprising the simplified residual calculation, the simplified half-pixel calculation and the simplified deblocking filtering.

17. The decoder according to claim 16, wherein
the mode determining module is further configured to, in the case that the expected power is smaller than the first average power,
if the expected power is greater than a product of the first average power and a first preset value, and the current operation mode of the decoder is the first operation mode, the second operation mode or the third operation mode, adjust the current operation mode of the decoder into an operation mode which is one level lower than the current operation mode in terms of complexity of the decoding process;
if the expected power is greater than a product of the first average power and a second preset value, and less than or equal to the product of the first average power and the first preset value, and the current operation mode of the decoder is the first operation mode or the second operation mode, adjust the current operation mode of the decoder into an operation mode which is two levels lower than the current operation mode in terms of complexity of the decoding process;
if the expected power is less than or equal to the product of the first average power and the second preset value, and the current operation mode of the decoder is the first operation mode, adjust the current operation mode of the decoder into an operation mode which is three levels lower than the current operation mode in terms of complexity of the decoding process;
where both the first preset value and the second preset value range from 0 to 1, and the first preset value is greater than the second preset value.

18. The decoder according to claim 16, wherein the mode determining module is further configured to, when the expected power is greater than the first average power,
if the expected power is less than a product of the first average power and a third preset value, and the current operation mode of the decoder is the second operation mode, the third operation mode or the fourth operation mode, adjust the current operation mode of the decoder into an operation mode which is one level higher than the current operation mode in terms of complexity of the decoding process;
if the expected power is less than a product of the first average power and a fourth preset value, and greater than or equal to the product of the first average power and the third preset value, and the current operation mode of the decoder is the third operation mode or the fourth operation mode, adjust the current operation mode of the decoder into an operation mode which is two levels higher than the current operation mode in terms of complexity of the decoding process;
if the expected power is greater than or equal to the product of the first average power and the fourth preset value, and the current operation mode of the decoder is the fourth operation mode, adjust the current operation mode of the decoder into an operation mode which is three levels higher than the current operation mode in terms of complexity of the decoding process;
where the third preset value is less than the fourth preset value and greater than 1.

19. The decoder according to claim 16, wherein the processor for executing program codes stored in the memory to further implement:
a nonzero element detecting switch configured to detect the number of nonzero elements in a macro block;
the residual processing module is further configured to omit inverse scanning, inverse quantization and inverse transformation of the macro block and to set the macro block to 0, in the case that the number of nonzero elements in the macro block is less than a preset threshold;
the inter-frame predicting module is further configured to determine a half-pixel according to four integer pixels adjacent to the half-pixel; and
the deblocking filtering module is further configured to
omit a deblocking filtering on an inter-frame encoding block in a horizontal direction if motion vectors of the inter-frame encoding block and an adjacent encoding block on the upside are opposite in the horizontal direction;
omit the deblocking filtering on the inter-frame encoding block in a vertical direction if motion vectors of the inter-frame encoding block and an adjacent encoding block on the left are opposite in the vertical direction.

* * * * *